(12) United States Patent
Hunt

(10) Patent No.: US 10,587,176 B2
(45) Date of Patent: Mar. 10, 2020

(54) CALIBRATED SLIP SYNCHRONOUS MACHINE

(71) Applicant: Sam R Hunt, Auson, TX (US)

(72) Inventor: Sam R Hunt, Auson, TX (US)

(73) Assignee: MSSB Motor Technology, LLC, Abilene, TX (US)

( * ) Notice: Subject to any disclaimer, the term of this patent is extended or adjusted under 35 U.S.C. 154(b) by 482 days.

(21) Appl. No.: 14/929,769

(22) Filed: Nov. 2, 2015

(65) Prior Publication Data

US 2017/0126103 A1    May 4, 2017

(51) Int. Cl.
*H02K 19/26* (2006.01)
*H02K 19/12* (2006.01)

(52) U.S. Cl.
CPC ............ *H02K 19/26* (2013.01); *H02K 19/12* (2013.01); *Y02E 10/725* (2013.01)

(58) Field of Classification Search
CPC ............................ H02K 3/12; H02K 11/0068
USPC ....................................... 310/159, 162, 68 R
See application file for complete search history.

(56) References Cited

U.S. PATENT DOCUMENTS

| | | | | | |
|---|---|---|---|---|---|
| 3,667,014 | A | * | 5/1972 | Merhof | H02P 1/46 318/715 |
| 4,051,419 | A | * | 9/1977 | Takahashi | G05B 19/293 318/721 |
| 4,683,411 | A | * | 7/1987 | Hamilton, Jr. | H02P 1/46 318/706 |
| 4,764,714 | A | * | 8/1988 | Alley | H02P 1/44 318/778 |
| 5,182,508 | A | * | 1/1993 | Schauder | B60L 3/0046 318/139 |
| 5,541,488 | A | * | 7/1996 | Bansal | G01P 3/48 318/801 |
| 8,390,240 | B2 | * | 3/2013 | Stancu | B60L 15/025 318/727 |
| 9,608,501 | B2 | * | 3/2017 | Yamaguchi | H02K 3/28 |
| 2011/0130996 | A1 | * | 6/2011 | Blind | H02P 6/182 702/94 |
| 2011/0243793 | A1 | * | 10/2011 | Kalin | H02P 8/14 422/67 |
| 2014/0210383 | A1 | * | 7/2014 | Marcetic | H02P 3/18 318/375 |
| 2015/0155773 | A1 | * | 6/2015 | Jung | H02P 27/08 363/55 |
| 2015/0326162 | A1 | * | 11/2015 | Yoo | H02P 21/0035 318/801 |

* cited by examiner

*Primary Examiner* — Forrest M Phillips
(74) *Attorney, Agent, or Firm* — Brian K. Yost; Geoffrey A. Mantooth

(57) ABSTRACT

A synchronous machine for connection to an electrical system may include a stator configured as a portion of the synchronous machine; a rotor configured as a portion of the synchronous machine being rotatable with respect to the stator; and a control circuit to control the rotor to allow the rotor to continuously slip with respect to the stator.

8 Claims, 6 Drawing Sheets

CALIBRATED SLIP SYNCHRONOUS MACHINE

CALIBRATED SLIP SYNCHRONOUS MACHINE

FIELD OF THE INVENTION

The present invention relates to electrical machines and more particularly to a synchronous machine.

BACKGROUND

A synchronous electric motor is an AC motor in which, at steady state, the rotation of the shaft is synchronized with the frequency of the supply current; the rotation period is exactly equal to an integral number of AC cycles. Synchronous motors contain multiphase AC electromagnets on the stator of the motor that create a magnetic field which rotates in time with the oscillations of the line current. The rotor with permanent magnets or electromagnets turns in step with the stator field at the same rate and as a result, provides the second synchronized rotating magnet field of any AC motor. A synchronous motor is only considered doubly-fed if is supplied with independently excited multiphase AC electromagnets on both the rotor and stator.

The synchronous motor and induction motor are the most widely used types of AC motor. The difference between the two types is that the synchronous motor rotates in exact synchronism with the line frequency. The synchronous motor does not rely on current induction to produce the rotor's magnetic field. By contrast, the induction motor requires "slip", the rotor must rotate slightly slower than the AC current alternations, to induce current in the rotor winding. Small synchronous motors are used in timing applications such as in synchronous clocks, timers in appliances, tape recorders and precision servomechanisms in which the motor must operate at a precise speed; speed accuracy is that of the power line frequency, which is carefully controlled in large interconnected grid systems.

Synchronous motors are available in sub-fractional self-excited sizes to high-horsepower industrial sizes. In the fractional horsepower range, most synchronous motors are used where precise constant speed is required. These machines are commonly used in analog electric clocks, timers and other devices where correct time is required. In high-horsepower industrial sizes, the synchronous motor provides two important functions. First, it is a highly efficient means of converting AC energy to work. Second, it can operate at leading or unity power factor and thereby provide power-factor correction.

Synchronous motors fall under the more general category of synchronous machines which also includes the synchronous generator. Generator action will be observed if the field poles are "driven ahead of the resultant air-gap flux by the forward motion of the prime mover". Motor action will be observed if the field poles are "dragged behind the resultant air-gap flux by the retarding torque of a shaft load".

There are two major types of synchronous motors depending on how the rotor is magnetized: non-excited and direct-current excited.

Vector control, also called field-oriented control (FOC), is a variable-frequency drive (VFD) control method where the stator currents of a three-phase AC electric motor are identified as two orthogonal components that can be visualized with a vector. One component defines the magnetic flux of the motor, the other the torque. The control system of the drive calculates from the flux and torque references given by the drive's speed control the corresponding current component reference.

In vector control, an AC induction or synchronous motor is controlled under all operating conditions like a separately excited DC motor. That is, the AC motor behaves like a DC motor in which the field flux linkage and armature flux linkage created by the respective field and armature (or torque component) currents are orthogonally aligned such that, when torque is controlled, the field flux linkage is not affected, hence enabling dynamic torque response.

Vector control accordingly generates a three-phase PWM motor voltage output derived from a complex voltage vector to control a complex current vector derived from motor's three-phase motor stator current input through projections or rotations back and forth between the three-phase speed and time dependent system and these vectors' rotating reference-frame two-coordinate time invariant system.

Such complex stator motor current space vector can be defined in a (d,q) coordinate system with orthogonal components along d (direct) and q (quadrature) axes such that field flux linkage component of current is aligned along the d axis and torque component of current is aligned along the q axis. The induction motor's (d,q) coordinate system can be superimposed to the motor's instantaneous (a,b,c) three-phase sinusoidal system. Components of the (d,q) system current vector, allow conventional control such as proportional and integral, or PI, control, as with a DC motor.

SUMMARY

The synchronous machine may include a first winding group and a second winding group. The first winding group may include at least one first conductor and the second winding group includes at least one second conductor. The first conductor and the second conductor may be configured in a stair step configuration from slot to slot.

The stair step configuration may include a first slot and a second slot. The first slot and the second slot may be directly adjacent to the first slot and both first conductor and the second conductor. The difference in number between the first conductor in the first slot and the first conductor in the second slot may be a single first conductor.

The difference between the second conductor in the first slot and the second conductor in the second slot may be a single second conductor.

The control circuit may include an angle generator to determine the angle of slip between the rotor and the stator.

The control circuit may include a magnitude generator to generate a magnitude of slip between the rotor and the stator.

The control circuit may include an angle summing circuit.

The control circuit may include a magnitude summing circuit.

The control circuit may include a first multiplier circuit to connect to the rotor.

The control circuit may include a second multiplier circuit to connect to the rotor.

BRIEF DESCRIPTION OF THE DRAWINGS

The invention may be understood by reference to the following description taken in conjunction with the accompanying drawings, in which, like reference numerals identify like elements, and in which.

DETAILED DESCRIPTION

Figure 2:
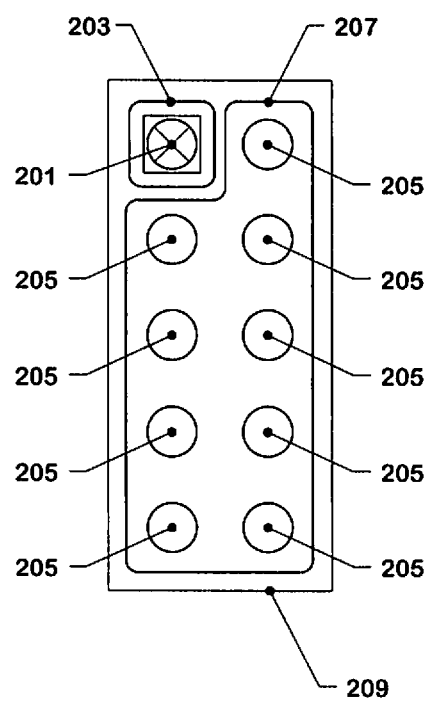
FIG. 2 illustrates a first slot of the calibrated slip synchronous machine of the present invention.
Figure 3:
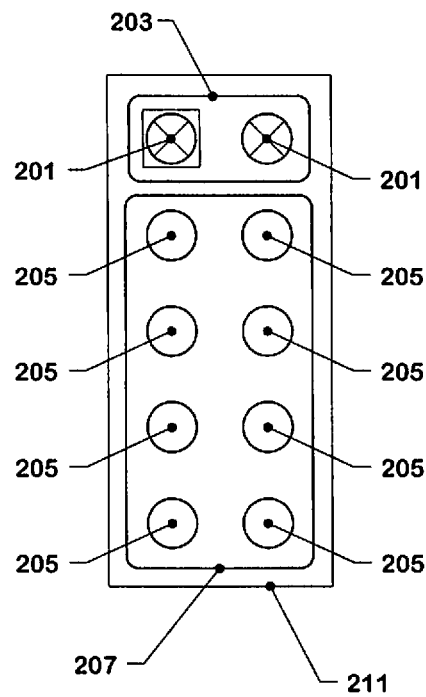
FIG. 3 illustrates a second slot of the calibrated slip synchronous machine of the present invention.
Figure 4:
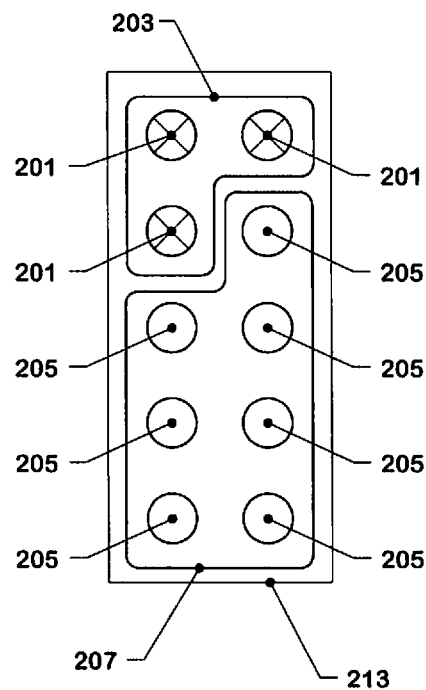
FIG. 4 illustrates a third slot of the calibrated slip synchronous machine of the present invention.
Figure 5:
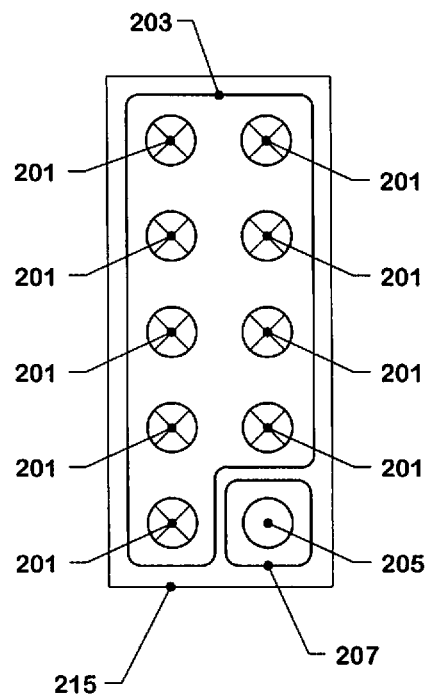
FIG. 5 illustrates a ninth slot of the calibrated slip synchronous machine of the present invention.
Figure 6:
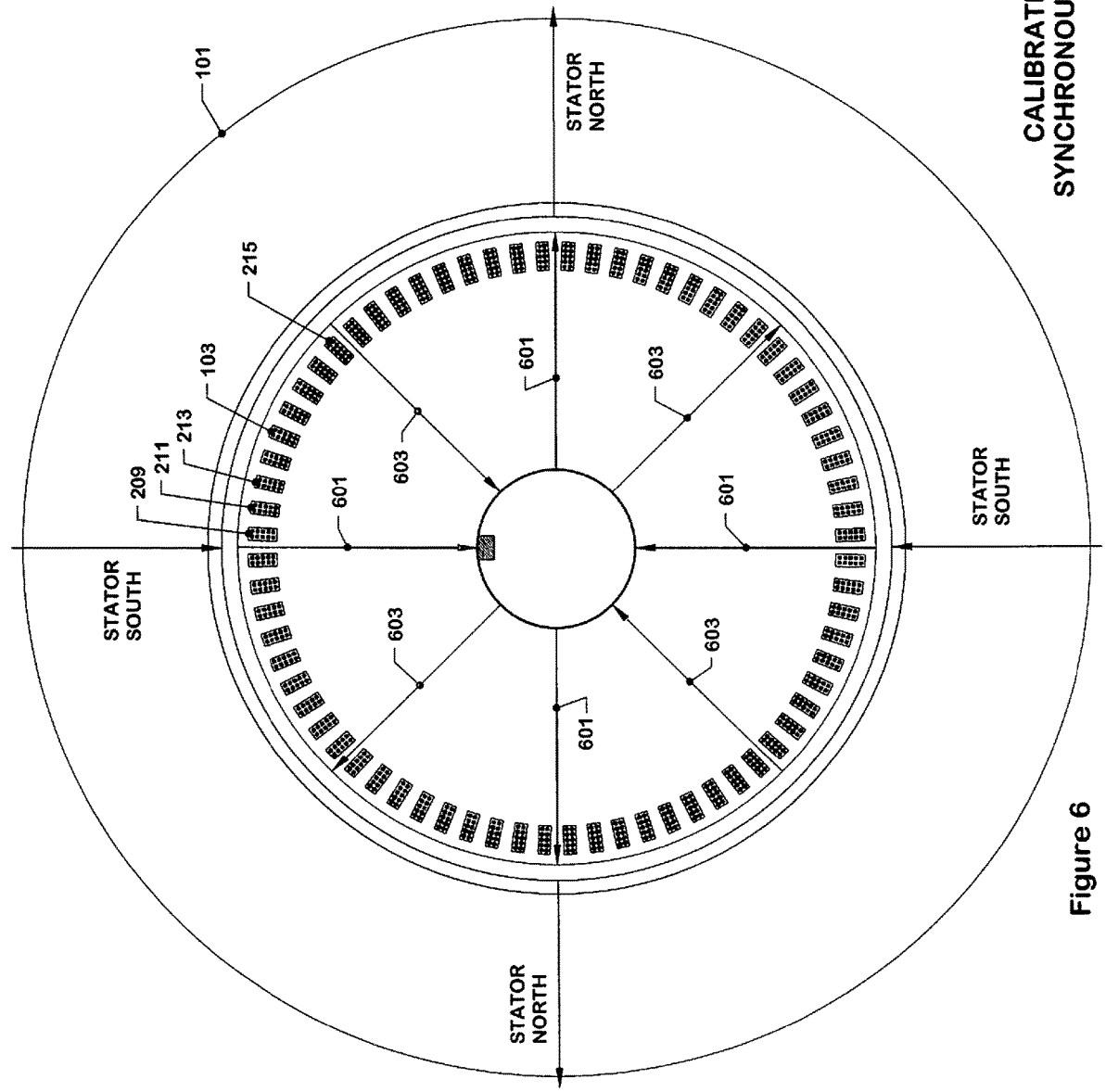
FIG. 6 illustrates a cross-sectional view of the stator and rotor of the calibrated slip synchronous machine of the present invention.

A calibrated slip synchronous machine of the present invention may include two winding groups 203, 207 on the rotor 103 to positively control the magnitudes and angles of the magnetomotive force (mmf) vectors about the rotor face 103. The stator 101 of the calibrated slip synchronous machine 100 of the present invention may be the same as a conventional synchronous machine stator. Specifically, the synchronous machine 100 of the present invention may include two winding (or more) 203, 207 distributed around the rotor face. Each winding 201, 205 may be energized by a dedicated set of slip rings 107 which may be connected to a control circuit 102 to control the current of the first winding group 203 and the second winding group 207, more particularly the current within the first winding 201 and the second winding 205. Each winding 201, 205 may be positioned together in a single slot and positioned in a plurality of common slots in a stair step fashion where the change in number of the windings 201 of the first winding group 203 and the change in the number of the windings 205 of the second winding group 207 in adjacent slots may be increased (or decreased) of a single winding 201 of the first winding group 203 and a decrease (or increase) of a single winding 205 and a decrease of the second winding group 207, keeping the total number of windings 201, 205 within a single slot the same. The present invention is advantageous for the number of slots on the rotor 103 to be two times the number of poles times an odd integer that is greater than one. An advantage of the present invention is for the number of turns or the number of sets of turns in each slot is to be any integral multiple of this odd integer plus one (1). The two winding groups 203, 207 may be continuously stair stepped in the number of winding 201, 205 with respect to each other winding groups 203, 207 as you move from slot to slot around the rotor face. This wiring configuration not only distributes an approximate sinusoidal mmf wave around the rotor 103 for any given desired mmf pole position angle, but also the configuration of the present invention also makes it easier to mechanically balance the rotor 103. It may be desirable to install a non-ferromagnetic spacer at both ends of the rotor to reduce stray flux into the end laminations of the rotor iron. The sinusoidal distributed mmf wave generated by the configuration transfers mostly only the fundamental magnetic field intensity across the air gap; therefore, transferring very little harmonics of the fundamental magnetic field strength component. This configuration may yield maximum transfer of energy conversion across the air gap with less heat losses than would be transferred across the air gap of a conventional machine. In addition, with the reduced harmonic components of the magnetic field strength, the need for a fractional pitch of the stator winding may become unnecessary. Since the heat transfer from the rotor 103 to the machine frame is sometimes modeled as an adiabatic process, this configuration should allow the rotor 103 to be cooled with a smaller than the conventionally designed air gap. This configuration should improve the torque-speed characteristic of the calibrated slip synchronous machine allowing more energy to be transferred with less rotor and stator steel/size than conventional machine designs. With an improved torque-speed characteristic, it may be desirable to skew the rotor. For example, if the odd integer is selected as the odd integer nine (9) for a four-pole machine, the number of slots would be seventy-two (72) and the number of turns of windings 201, 205 passing through each slot could be ten (10). The sequence of the conductor/windings 201, 205 is to add a single first conductor 201 from winding group one 203 and reduce a single conductor 205 from winding group two 207 and to an adjacent slot starting with a single first conductor 201 from winding group 1 203 and nine second conductors 205 from winding group 2 207 until there is a single conductor 205 from group 2 207 and nine conductors 201 from group 1. For a seventy-two (72) slot rotor, Slot One (1) 209 as illustrated in FIG. 2 would have one (1) first conductor 201 positioned in the slot 209 from winding group one (1) 203 and nine (9) second conductors 205 positioned in the slot 209 from winding group two (2). Slot Two (2) 211 would have two (2) first conductors 201 laid in the slot 211 from winding group one (1) 203 and eight (8) second conductors 205 positioned in the slot 211 from winding group two (2) 207. Slot Three (3) 213 would have three (3) conductors 201 positioned in the slot 213 from winding group one (1) 203 and seven (7) conductors 205 positioned in the slot 213 from winding group two (2) 207. The sequence would continue, Slot Nine (9) 215 would have nine (9) conductors 201 positioned in the slot 215 from winding group one (1) 203 and one (1) conductor 205 laid in the slot 215 from winding group two (2) 207. The sequence/for the next nine slots is reversed with respect to the above description by reducing the conductors by a single conductor 201 from group 1 (1) 203 an increasing the conductors by a single conductor 205 from group 2 (two) 207 to start from nine conductors 201 from group number one 203 and one conductor 205 from group number two 207 until there are nine conductors 205 from group 2 207 and one conductor 201 from group 1 203. Slot Ten (10) would be wound the same way as Slot Nine (9) with current flowing in the opposite direction in winding group 2 207 and flowing in the same direction in winding group 1 203.

There are four rotor areas per winding group that are equally spaced and are positioned at centers of the pole faces for this four (4) pole machine example. The four rotor steel pole center areas of Winding Group One are shifted ninety (90) electrical degrees with respect to the four rotor steel pole center areas of Winding Group Two (2) for this four (4) pole example. The rotor areas between Slots Nine (9) and Ten (10), between Slots Twenty-seven (27) and Twenty-eight (28), between Slots Forty-five (45) and Forty-six (46), and between Slots Sixty-three (63) and Sixty-four (64) are the centers of the four pole faces for Winding Group Two (2). The rotor steel areas between Slot Seventy-two (72) and slot One (1), between Slots Eighteen (18) and Nineteen (19), between Slots Thirty-six (36) and Thirty-seven (37), and between Slots Fifty-four (54) and Fifty-five (55) are the centers of the four pole faces for Winding Group One (1). If Winding Group One (1) is energized through its slip rings with a specific per unit quantity X of current times the Cosine of the desired mmf vector angle k and Winding Group Two (2) is energized through its slip rings with approximately the same specific quantity Y of current times the Sine of the desired mmf vector angle k, the magnetic flux pattern will shift forward by the approximately the a pre-determined mmf vector angle k from the zero degree location. Two control loops are established between the rotor shaft speed and position (one input), the machine terminal voltage or reactive power (another input) and the two current sources (two outputs) connected to two sets of slip rings to positively control and calibrate the slip of the rotor. This configuration not only allows the position of the rotor relative to the stator mmf wave to change, this configuration also allows the operation of the rotor at a specific speed with respect to the mmf wave speed of the stator.

The calibrated slip synchronous machine can be used in applications that would be traditionally used by induction machines; however, the rotor windings of the calibrated slip synchronous machine can be excited to operate the machine at any desired power factor that are within the machines operating limits. If a factory is being penalized by the electricity provider for poor power factor, then the factory can operate these calibrated slip synchronous machines at such a rotor excitation that will bring the entire factory electrical load up to unity power factor. This will also reduce electrical losses to both the factory and the electricity provider. If a military installation needs a voltage support at the end of a feeder, then these calibrated slip synchronous machines may replace the induction machines and may be operated at a rotor excitation as described above to establish proper bus voltage and system stability. Additionally the calibrated slip synchronous machine may be operated at precise rotor speeds desired by the operator. This flexibility may allow the operator to operate the calibrated slip synchronous machine in low speed high torque situations and may be used to reduce the inrush of currents that are normally high in both induction machine and traditional synchronous machine technologies. This configuration may be useful in both the mining industry and the gas and oil industry in applications where high torque and variable speeds are desired in motors while maintaining good voltage at the end of a long feeder. If used in a mechanical to electrical energy conversion application, the calibrated slip synchronous machine rotor of the present invention may be configured and operated to accurately match the prime mover speed and position with the stator mmf wave speed and position to join and couple the two energy sources across the stator-rotor air gap. This could be very useful in the wind energy industry applications where power system stability is desired and where a wind farm owner may want to classify his farm as a black start unit and receive payments from the transmission grid entity for this status.

The present invention is a calibrated slip synchronous machine. In induction machine technology, the only time that a conventional machine is running at synchronous speed is when your transitioning from motor to generating mode or vice versa or when the conventional machine is operating at that threshold. The arrows show the MM F magneto motor force patterns between the stator and motor of the machine. In a synchronous machine, if you do not move the magneto motor force patterns, the conventional synchronous machine will remain lockstep with whatever source you are connected to whether it is the electric utility or another utility bus. A conventional synchronous machine has to run in lockstep or not run (zero rotation) unless the synchronous machine is slipping poles which are a very adverse condition for a machine.

The present invention provides a calibrated slip synchronous machine for moving the poles around the rotor, remagnetizing the rotor while the calibrated slip synchronous machine is running. The present invention changes the MMF pattern about the rotor and puts calibrated slip synchronous machine in acceleration or deceleration during this transition.

The present invention achieves an asynchronous machine characteristic with a variable speed by controlling two groups of windings. Energizing only one winding while not energizing the remaining winding is within the scope of the present invention but may result in less than optimal operation.

The slipping of the rotor can be achieved by stair stepping the positions of the first windings and the second windings within respective slots of the stator and by changing the excitations of the first winding group and second winding group in a coordinated fashion as described above. The slippage of the rotor can be controlled by moving the mmf waves predictably around the rotor face causing the calibrated slip synchronous machine to run slower or faster in accordance with the changing magnitudes of the currents within the first winding group and the second winding group respectively. In mining operations, there are large motor loads at the end of a long line of feeders for example electric feeders, such as three-phase feeders. The present invention is able to connect to a calibrated slip synchronous machine of the present invention and control the windings (winding group 1, winding group 2) to push the voltage at the end of these long feeders back up to 100% where the power factor is unity or to send VARS back to the source, changing the reactive power to change the power transfer at the end of the line to a near maximum. In addition to the above benefits, the present invention can be used in a wind farm application including turbines where the MMF patterns are going around the stator.

In the application of a conventional synchronous machine used in a wind turbine, this conventional synchronous machine is locked to one speed. In this case, it would be difficult for the conventional synchronous machine to optimize the torque speed characteristic of the prime mover.

If you introduce the present invention with the calibrated slip synchronous machine to the above situations and others, the torque speed characteristic can be adjusted to obtain the maximum power delivery to the power grid possible. Not only is the present invention usable in polyphase but also in single phase applications.

The 72 rotor slot four pole machine example has 36 slots per pole set. The MMF pole distribution and pattern is approximately sinusoidal all of the way around the four pole faces.

The control circuit 102 is used to control the winding currents.

The significance of the pole faces define where the direct and quadrature axes lie on the rotor. The characteristic of the direct and quadrature axes is for protection and control and to calculate the transfer of power across the air gap. For a four pole machine example, for winding 1 203 there would be two direct axes 601 and two quadrature axes 603 and for winding 2 207 again there would be two direct axes 603 and two quadrature axes 601. Under dynamic control you are moving a virtual set of direct and quadrature axes around the rotor face 103 which is a virtual movement as you project it and which is a real movement when you measure it.

Figure 1:
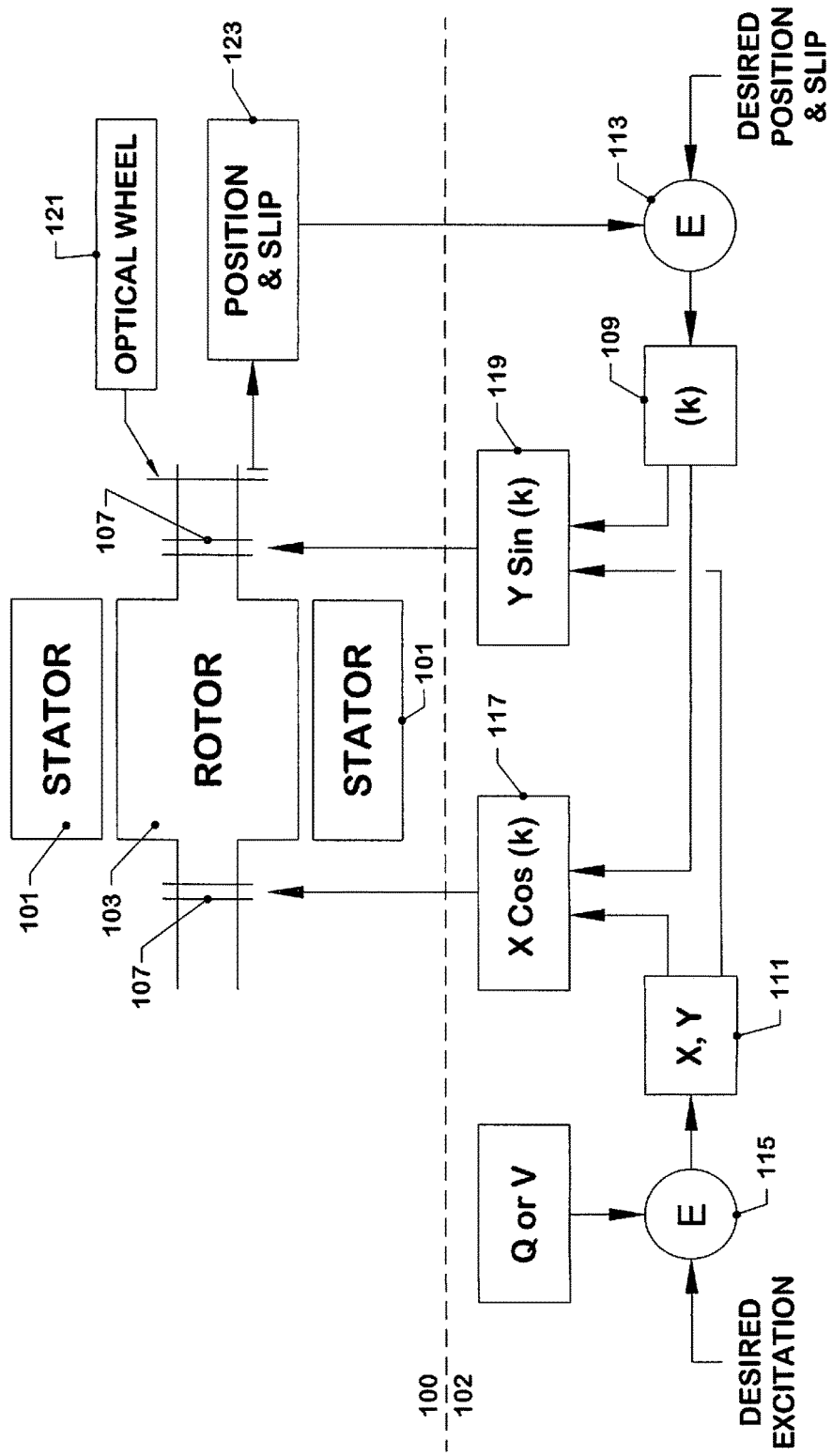
FIG. 1 illustrates a control system for a calibrated slip synchronous machine of the present invention.

FIG. 1 illustrates a control system including a control circuit 102 for the calibrated slip synchronous machine 101 of the present invention and illustrates a stator 101 which may extend around a rotor 103 which may cooperate with a shaft 105 which may rotate. The calibrated slip synchronous machine 100 may operate as a generator or may operate as a motor in accordance with the teachings of the present invention. The shaft 105 may be connected to a position sensor 121 which may be an optical wheel to provide an indication of the position such as the rotational position of the shaft and to provide an indication of the slip of the calibrated slip synchronous machine 100. FIG. 1 additionally illustrates a first multiplier circuit 117 and a second multiplier circuit 119 which may be connected to slip rings 107 which may be positioned on the shaft 105 to connect to the first winding group and the second wiring group respectively which may be positioned within the rotor 103. The desired position and slip of the rotor 103 and the output from the position and slip circuit 123 which provides the actual position and slip of the rotor 103 may be input to the summing circuit 113 which may calculate the difference between the two inputs. Alternatively, only one of these two inputs are referenced against desired while the other input may establish an operational bandwidth (set of boundaries). The slip quantity is the time derivative of position quantities and is calculated. The output of the summing circuit 113 is input to the angle generator 109 to generate an angle based upon the desired position and desires slip. The magnitude of the desired excitation is input to the magnitude summing circuit 115 and the Q or V where the symbol Q may be the symbol for reactive power and V may be the symbol for voltage. is additionally input to the magnitude summing circuit 115. The output of the magnitude summing circuit 115 is input to the magnitude generating circuit 111 to generate a magnitude for the first multiplier circuit 117 and the second multiplier circuit 119, and the output of the angle generator 109 is input to the first multiplier circuit 117 and the second multiplier circuit 119. The first multiplier circuit 117 multiplies the magnitude by the cosine of the angle and the second multiplier circuit 119 multiplies the magnitude by the sine of the angle. The output of the first multiplier circuit 117 and the second multiplier circuit 119 is input to first winding group and the second winding group of the rotor 103.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed.

The invention claimed is:

1. A calibrated slip synchronous machine for connection to an electrical system, comprising:
    a stator configured as a portion of the synchronous machine;
    a rotor configured as a portion of the synchronous machine being rotatable with respect to the stator;
    the rotor comprising first and second winding groups adapted to be energized; and
    an electrical control circuit comprising a first multiplier adapted to provide a first current to the first winding group at a first slip angle and a second multiplier adapted to provide a second current to the second winding group at a second slip angle such that the electrical control circuit is adapted to allow the rotor to continuously slip with respect to the stator.

2. A synchronous machine for connection to an electrical system as in claim 1, wherein the first winding group includes at least one first conductor and the second winding group includes at least one second conductor and wherein the first conductor and the second conductor are configured in a stair step configuration from slot to slot.

3. A synchronous machine for connection to an electrical system as in claim 2, wherein the stair step configuration includes a first slot and a second slot and wherein the first slot and the second slot directly adjacent to the first slot includes both first conductor and the second conductor, wherein the difference in number between the first conductor in the first slot and the first conductor in the second slot is a single first conductor.

4. A synchronous machine for connection to an electrical system as in claim 2, wherein the difference between the second conductor in the first slot and the second conductor in the second slot is a single second conductor.

5. A synchronous machine for connection to an electrical system as in claim 1, wherein the control circuit includes an angle generator to determine the angle of slip between the rotor and the stator.

6. A synchronous machine for connection to an electrical system as in claim 1, wherein the control circuit includes a magnitude generator to generate a magnitude of slip between the rotor and the stator.

7. A synchronous machine for connection to an electrical system as in claim 1, wherein the control circuit includes an angle summing circuit.

8. A synchronous machine for connection to an electrical system as in claim 1, wherein the control circuit includes a magnitude summing circuit.

* * * * *